Nov. 9, 1954

G. B. CARSON 2,694,131

THERMOPLASTIC CEMENT ACTIVATOR
FOR CEMENT COATED SHOE PARTS

Filed March 22, 1950

INVENTOR.
Gordon B. Carson
BY
Wood, Arey, Herron & Evans
ATTORNEYS

Nov. 9, 1954

G. B. CARSON 2,694,131

THERMOPLASTIC CEMENT ACTIVATOR
FOR CEMENT COATED SHOE PARTS

Filed March 22, 1950

INVENTOR.
Gordon B. Carson
BY
Wood, Arey, Henn
ATTORNEYS

United States Patent Office 2,694,131
Patented Nov. 9, 1954

2,694,131

THERMOPLASTIC CEMENT ACTIVATOR FOR CEMENT COATED SHOE PARTS

Gordon B. Carson, Portsmouth, Ohio, assignor to Selby Shoe Company, Portsmouth, Ohio, a corporation of Ohio Application March 22, 1950, Serial No. 151,186

4 Claims. (Cl. 219—19)

This invention relates to a machine for activating thermoplastic cement or adhesive and is particularly directed to a machine for "activating," i. e., rendering adhesive or sticky, hardened cement previously applied to shoe platforms or soles to prepare them for permanent attachment to shoe bottoms.

In the manufacture of cement process shoes, it is customary to apply a thermoplastic cement in liqued form to the marginal areas of the platform or sole which are to be attached to the shoe bottom. The cement is allowed to harden or dry and the platforms are stored awaiting assembly. At assembly, the platforms are placed in a cement activator where they are briefly exposed to heaters which activate the cement. Immediately thereafter, they are placed in an attachment press where they are held in adhesive contact with the shoe bottom until the activated cement sets and a permanent attachment is formed.

It has been extremely difficult to coordinate the operation of the cement activator so that a platform bearing freshly activated cement is available for delivery to the attachment press every time the press is ready to receive one. This problem arises from the fact that the time required to press the platform into permanent attachment with the shoe bottom is considerably shorter than the length of the time required to heat the cement to make it suitably tacky or adhesive to fulfill its intended purpose. For example, certain desirable types of thermoplastic cements require activation heating periods of approximately 30 seconds duration while the cyclical operating time of certain conven.ional presses is approximately 15 seconds in duration. Consequently, if platforms are activated one at a time, the press must wait on the delivery of the platforms from the heater and considerable operating time is lost. Alternatively, if a number of platforms are activated simultaneously, the press can only handle one at a time and the activated cement on the other platforms begins to set or harden while awaiting the press. Another system in use today requires the operator to stagger the feed of platforms to the activator and the withdrawal of platforms from the activator in response to the demands of the press. The system is unsatisfactory because it depends on the operator's fallible memory of the order of platform succession through the activator and his ability to stagger the heating periods without either underexposing or overexposing the platforms.

The primary object of the invention is to provide a platform cement activator capable of intermittently delivering platforms bearing freshly activated cement at periodic intervals coincident with the periodic requirements of the associated attachment press.

In order to achieve intermittent delivery, the machine is constructed and arranged to utilize the principle of staggered heating with the result that while it is in operation a number of platforms in varying degrees of activation are being heated simultaneously. However, the machine of this invention insures the delivery of the platforms in the proper order so that in any given series the first platform into the activator is also always the first platform out of the activator. Furthermore, the heating and delivery of the platforms is at all times under the control of the operator who may delay or hasten the delivery of the platform in accordance with the requirements at assembly. In the event that the operator wishes to delay delivery of the platforms, the machine will hold them safely without burning them. Hence, a platform bearing completely activated cement may be made available for delivery to the press every time the press is ready to receive it. Moreover, the platforms need not be delivered until the press has completed its previous operating cycle and is ready to immediately receive the next platform. Consequently, the platforms are not delivered prematurely so they they have to await the press and there is no opportunity for the activated cement to set and harden.

A typical machine constructed in accordance with these objectives and the principles of this invention comprises a platform loading station, a plurality of spaced heating stations, a platform discharge station, a conveyor adapted to hold a plurality of regularly spaced platforms and movable in a path from the loading station where the platforms are loaded on the conveyor, and successively to the heating stations where the platforms are heated progressively or gradually, to the discharge station where the activated platforms are unloaded from the conveyor, and means under the control of the operator for intermittently advancing the conveyor from station to station. The movement of the conveyor is automatically halted for a brief period each time it is indexed from station to station. During these periods, the platforms at the heating stations are subjected to intense activation heat and the operator removes a platform bearing activated cement from the discharge station and places a platform bearing inactive cement on the conveyor at the loading station. Hence, the machine functions to discharge an activated platform each time it is indexed, and it may be indexed at the conclusion of each heating period.

In accordance with this invention, the heating periods to which the platforms are exposed at the several heating stations are fractional parts of the total heating time required for complete activation of the cement. Moreover, the length of each fractional period is substantially equal to the cyclical operating time of the associated attachment press. For example, if the cement utilized requires a 30 second total heating period for complete activation and the cylical operating time of the associated attachment press is 15 seconds, the platform cement activator may preferably utilize two heating stations, each of which subjects the platform to heat for a 15 second interval. This permits the conveyor to be indexed every 15 seconds and deliver an activated platform in coincidence with the periodic demands of the press.

Another problem inherent in previous activation systems is that serious damage from burning, charring and de-hydration often results to the shoe platforms from overexposure to the heat required for cement activation. In particular, damage from overheating most often results to the central portion of the platform which is not covered by a coating of cement and consequently is completely unprotected from the heat to which it is subjected. In fact, the central portions of the platform are so vulnerable that they occasionally become severely damaged or completely ruined before the cement on the margins is heated to a plastic condition. Moreover, the excess heat to which the central portion of the platform is exposed, besides being harmful, is unnecessary and consequently is wasted.

It is an additional object of this invention to provide a machine including heaters adapted to direct activation heat on the cement coated portions of the platform without overexposing the other portions of the platform to damaging heat. However, the heaters of this invention are so constructed and arranged that the entire platform is subjected to sufficient heat to render it pliable and soft, thereby facilitating the subsequent configuration and attachment of the platform to the bottom of the shoe.

Other objects and advantages of the invention will be readily apparent from the following description and drawings in which.

Figure 3:
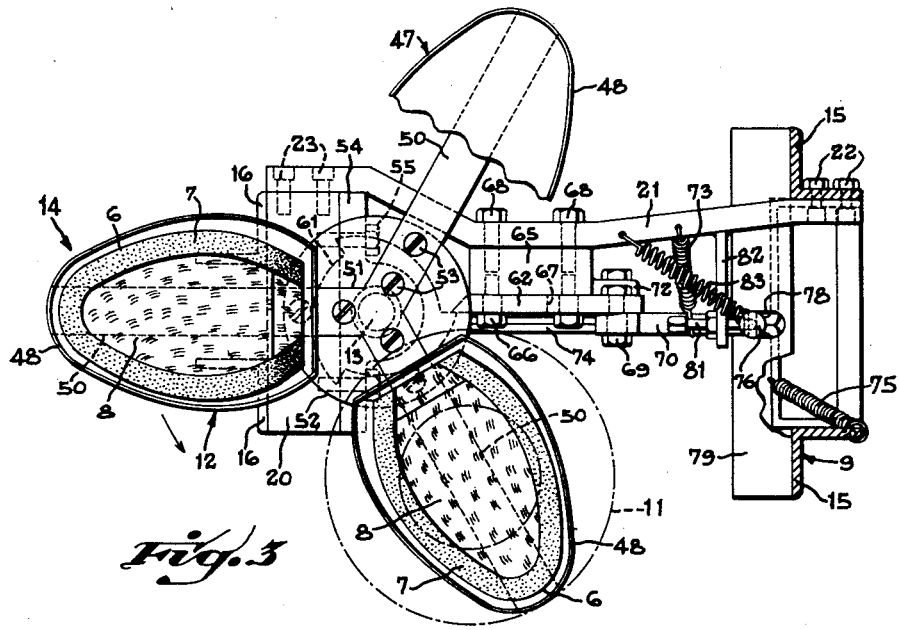
Figure 3 is a horizontal sectional view which is partially fragmentary taken along line 3—3 of Figure 1.

The platforms which are activated by the machine of this invention are shown in work holders on the machine in Figure 3. Generally described, they comprise a leather body portion 6 shaped to conform to the sole portion of the shoe. A thin coating 7 of thermoplastic cement which is to be activated covers the marginal portions of the platform leaving the central portion 8 of the platform uncovered and unprotected.

Figure 1:
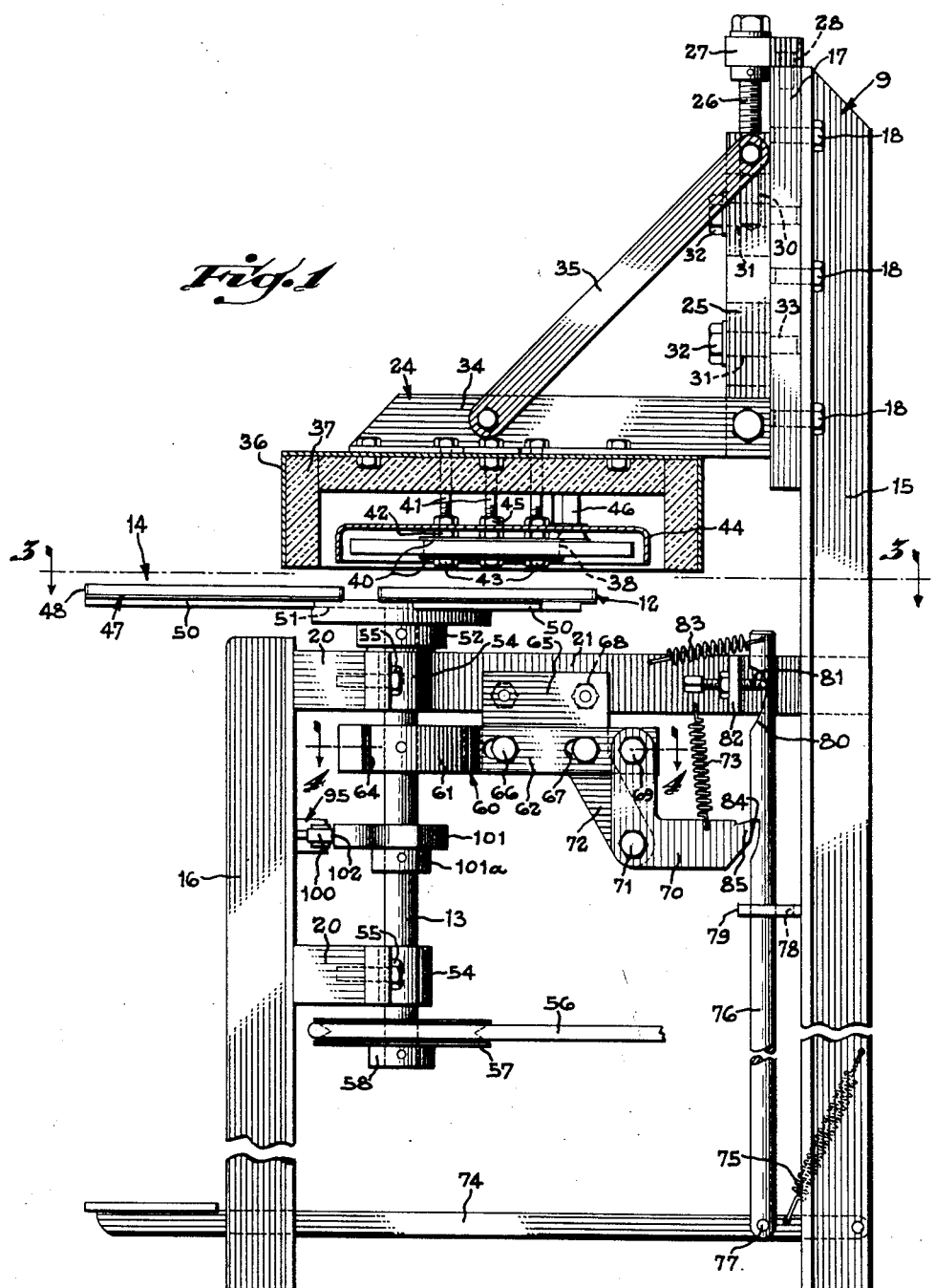
Figure 1 is a side elevation, partially in section, of a cement activating machine constructed in accordance with the principles of this invention.
Figure 2:
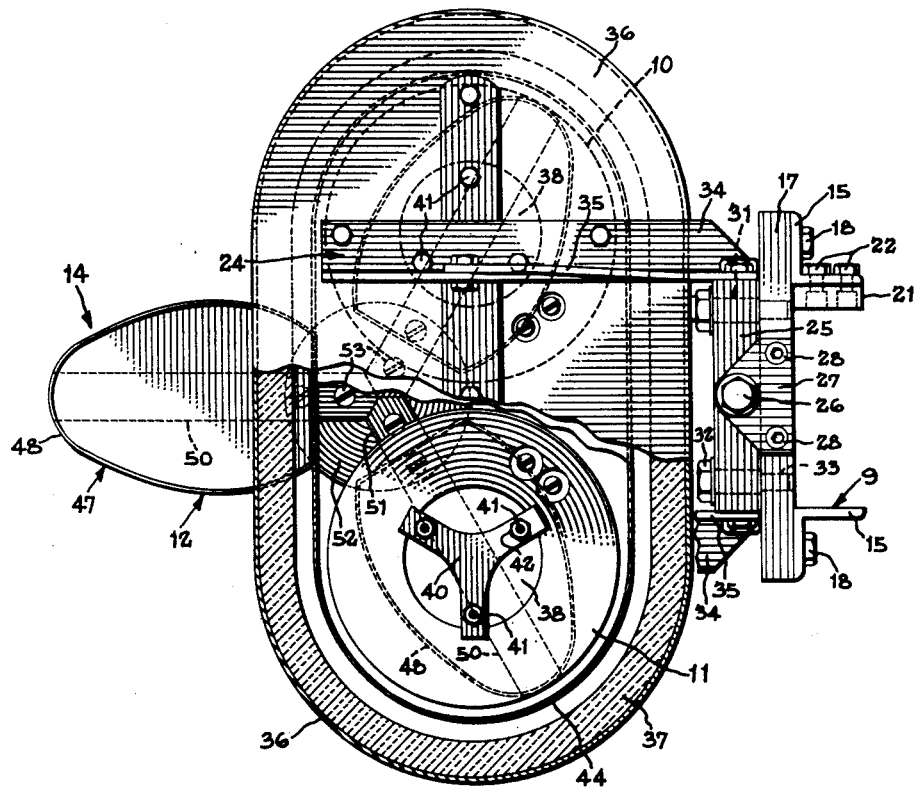
Figure 2 is a top plan view of the machine in which the heater cover is broken away in order to show the relationship of the common turret to the heating elements when the turret is fully aligned with the heaters.

Referring to Figures 1, 2 and 3 of the drawings, a preferred embodiment of the machine of this invention comprises a frame 9 upon which is mounted a pair of spaced heaters 10 and 11 and a turret-type platform conveyor 12. The conveyor comprises a rotatable shaft 13 carrying three radially projecting holders which, upon rotation of the shaft, are successively presented to a loading station 14 at the front of the machine where the platforms are located, to the first heater 10, thence to the second heater 11, and finally to the unloading station which, in the embodiment shown, coincides with the loading station. The coincidence of the loading and unloading stations is particularly advantageous because the operator may load and unload the platforms without changing position.

Described in more detail, the frame has a pair of rear legs 15 which in the embodiment shown are fabricated from strips of angle iron and a pair of front legs 16 which are also constructed from angle iron strips. The back legs are tied together and maintained in spaced relationship by means of a backing plate 17 which is secured between them near their upper portions by means of bolts 18. The front legs 16 are tied together and held in properly spaced relationship by transversely extending upper and lower spacers 20 which may be welded to the flanges of the front legs. As best seen in Figure 3, the front legs are secured to the back legs by means of a rib 21, the opposite ends of which are respectively bolted to the inside of one of the rear legs by means of bolts 22 and to the outside of the top spacer 20 by means of bolts 23.

In the embodiment shown (Figures 1 and 2), the heater elements 10 and 11 are mounted on a head indicated generally at 24 which is vertically adjustable in relation to the work holding turrets to permit the operator to move the heaters toward and away from the platforms and thereby vary the temperature at the platforms. The vertically adjustable head comprises a slide 25 which is adapted to ride up and down in facial contact with the backing plate 17. This movement is accomplished by rotation of an elevating screw 26 which is journalled in a bracket 27 secured to the top of the plate 17 by means of bolts 28. The lower end of the screw 26 is in screwthreaded engagement with a threaded hole 30 extending vertically downward through the top of the slide 25. Elongated vertical slots 31 are cut through slide 25, to pass clamping bolts 32 seated in bolt holes 33 formed in the backing plate and permit relative movement of the slide with respect to the bolts when the bolts are unclamped. In order to move the slide upwardly or downwardly, the operator simply loosens the clamping bolts 32 and rotates the elevating screw until the slide has moved to the desired position.

Extending laterally from the bottom of the slide are a pair of angle iron overarms 34 which are supported by braces 35 extending between the top of the vertical slide and the overarms. The arms support an oval-shaped sheet metal heater cover 36 which is protected from the upwardly radiating heat from the heaters by a lining of sheet asbestos 37. Suspended within the heater cover are the ring-type sheet metal heater elements 10 and 11, which are arranged to cover the cement coated portion of the platforms. Each of the heaters has a central aperture 38. As best seen in Figure 2, these apertures are aligned with the central portion of the platforms, when the platform holders are aligned with the heaters. Consequently, they do not radiate heat directly downwardly on the unprotected central portions of the platforms. However, the central portion of the platforms are indirectly subjected to laterally radiating heat from the ring heaters and consequently are rendered soft and pliable without being burned or demoisturized.

Each heater is supported by a pair of spider clips 40, the arms of which bridge the apertures and engage the marginal areas adjacent the apertures. Each spider arm has a bolt hole which passes a suspension bolt 41 fastened to the angle iron overarm directly above it. On each bolt a pair of tension nuts 42 and 43 in provided which bear on the respective clips and force the arms toward the corresponding arms on the other clip and into clamping engagement with the edge of the heater element. The upper nut 42 of each pair serves as a spacer element for an oval-shaped chromium plated reflector 44 which encompasses both heaters. An additional securing nut 45 is provided on each bolt to lock the heater element in place against the nut 42. Energizing current is supplied to the electric heaters through extension terminals 46 which project upwardly from the heater through the reflector, the asbestos lining and the cover. Appropriate leads (not shown) may be connected to the screws at the end of the terminals as desired.

The turret-type conveyor which successively presents the platforms to the heat radiating from the respective heaters is provided with sheet metal work holding dishes 47 which are generally shaped to conform to the shape of the platforms. They are provided with struck-up peripheral retaining lips or flanges 48 which serve to contain the platforms in the dishes. At best seen in Figures 1, 2 and 3 each work dish is mounted on an arm 50 projecting radially from shaft 13 and arcuately spaced in 120° relationship to each of the other arms. This spacing corresponds to the spacing between the respective heaters and the loading and unloading station. The shaft end of each arm is fastened in a radial slot 51 formed in a shaft hub 52 by means of bolts 53. The shaft proper extends vertically downward and is journalled in pillow blocks 54—54 fastened to the spacers 20 by means of bolts 55. The shaft is rotated by an electric motor, not shown, which transmits power through a V-belt 56 which in turn drives a pulley 57 keyed to the shaft 13 and supported by a stop collar 58. It should be observed at this point that the belt 56 is adjusted so that there is sufficient tension between it and the pulley 57 to provide a frictional driving engagement when the shaft is free to turn about its own axis. However, when the shaft is prevented from turning by the stop mechanism which is indicated generally at 60, the belt slips freely in the pulley and the motor is not overloaded. The belt-pulley combination consequently functions as a clutch.

Hence, as the shaft turns in response to the motor drive, the individual work holders are moved in a circular path and successively presented to the loading station 14, where they project from beneath the heater cover and extend forwardly at the front of the machine in a position of convenient access to the operator, to a position below the first heater 10, thence to the second heater 11 and finally returned to the loading station.

As the turret is moved through its circular path, it is automatically stopped after each 120° of rotation. The stop mechanism 60 operates to arrest the movement of the shaft each time two of the holders are in exact alignment with the heating elements and the third holder is at the loading station. After the desired heating period, the operator releases the stop mechanism and permits the shaft to continue rotation until the following holders are brought into respective registry with the heaters and the loading station. Each time the mechanism is stopped, the platforms contained in the dishes exposed to the heaters are subjected to activation heat and the operator removes an activated platform from the turret at the loading station and replaces it with another plaform carrying an inactive coat of cement. Consequently, when the device is in operation, the operator loads a platform at the loading station. The shaft rotates until the platform is in alignment with the first heater 10 whereupon it is stopped and the platform is exposed for an initial heating period, the stop mechanism is released and the shaft rotates until the platform is exposed to the second heater 11, whereupon the stop mechanism arrests the movement of the shaft and the platform is subjected to a second heating period. After the second heating period, the shaft is permitted to rotate again until the platform is returned to the loading station where the turret is again stopped and the platform removed.

Figure 4:
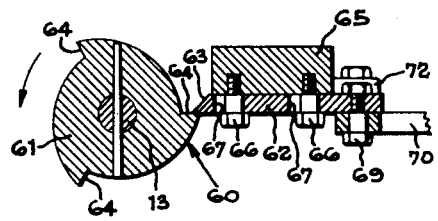
Figure 4 is a sectional view taken along line 4—4 of Figure 1.

The stop mechanism is best shown in Figures 1 and 4 and comprises an indexing ratchet 61 which is pinned to the shaft 13 and a retractable ratchet follower or stop plate 62 having a finger 63 adapted to ride on the ratchet surface. The ratchet is provided with three shoulders 64 which correspond to each of the work holders and are arranged in relation to the shaft in correspondence with the positions of registry of the platform holders with the two heaters and the loading station respectively. The stop plate 62 is slidably fastened, for lateral reciprocating movement, to a bracket 65 by means of bolts 66 which project through lateral slots 67 formed in the stop plate 62. As best seen in Figure 1, the bracket 65 is secured to the rib 21 by means of bolts 68. The rearward end of the stop plate is pivoted through a bolt 69 to one arm of a bellcrank 70 which is in turn pivoted for movement about a pivot bolt 71 fastened to an arm 72 integral with the bracket 65. In order to insure contact between the stop plate finger 63 with the surface of the ratchet 61, a spring 73 is stretched between the rib 21 and the horizontal arm of the bellcrank 70. This spring normally tends to urge the bellcrank in counterclockwise rotation about the pivot bolt 71 constantly forcing the follower plate 62 toward the surface of the ratchet 61.

It will be apparent from an inspection of Figures 3 and 4 that the follower plate finger 63 will ride the convolute surface of the ratchet as the shaft 13 rotates until one of the shoulders 64 is brought into abutting contact with it. At this point, the work turrets are disposed in registered alignment with the heaters and loading station and the finger 63 stops further movement of the shaft. The V-belt 56 will slip on the pulley 57 during this interval.

Means are provided to permit the operator to withdraw the stop finger from engagement with the ratchet shoulder after a suitable heating period in order to permit the shaft to continue rotation. These means also include provisions for automatically releasing the follower 62 from withdrawn or retracted position so that it returns to operative engagement with the ratchet in time to abut the following shoulder 64 of the ratchet and stop the turret at the next station. This latter feature is particularly desirable since it serves to prevent the operator from holding the stop finger in retracted position for such a long time that he inadvertently fails to return the finger to coactive engagement with the ratchet in time to arrest the movement of the holders when they come into alignment with the following station. Hence, if this feature were not provided, the operator might inadvertently allow the turret to skip a station or stations and the cement on some platforms would not be completely activated by reason of insufficient exposure to heat.

This mechanism comprises a foot pedal 74 which is pivotally mounted on the rear frame leg and is urged upwardly by a spring 75 anchored on the frame leg 15. A vertical pull rod 76 is pivotally fastened to the pedal 74 by means of a pin 77 and extends upwardly through an oversized lateral slot 78 in a guide bracket 79.

The top of the pull rod is provided with a curved arm surface 80 which is engaged by a cam screw 81 adjustably mounted in a bracket 82 welded to the rib 21. The cam surface 80 is held in engagement with the point of the cam screw by means of a coil spring 83 anchored to the rib 21. Vertical movement of the rod in response to actuation of the foot lever 74 will cause the screw 81 to bear on the cam surface 80 and force the rod 76 in oscillating movement about its pivot 77. During oscillation the rod passes back and forth along the guide slot 78 in bracket 79.

Movement of the foot pedal is transmitted through the pull rod to cause clockwise turning movement of the bellcrank 70 and retraction of the ratchet stop finger by the engagement of a shoulder 84 formed on the pull rod 76 with a projection 85 formed on the horizontal arm of the bellcrank. When the operator desires to release the turrets for rotation, he steps on the pedal 74 which causes downward vertical movement of the rod. Shoulder 84 forces the projection 85 downwardly and the bellcrank pivots in a clockwise direction retracting the stop plate finger. During this movement, the upper part of the pull rod is forced rearwardly by the coaction of the screw 81 and the cam surface 80. This results in the entire rod pivoting in a clockwise direction about pivot pin 77. Projection 85 on the bellcrank swings arcuately away from the shoulder 84 and the two movements result in the disengagement of the projection from the shoulder thereby releasing the bellcrank for counter-clockwise rotation under the urging of spring 73. This spring immediately returns the stop plate 62 into coactive engagement with ratchet 61 in time for the finger to abut the following stop shoulder 64. When the operator releases the foot pedal 74, the spring 75 urges it upwardly in arcuate rotation and forces the pull rod upwardly until the shoulder 84 reengages projection 85 on the bellcrank. The mechanism is now set to accomplish withdrawal of the finger at the conclusion of the next heating period.

A distinctive feature of this invention is the provision of means for automatically deenergizing the heating elements a predetermined time interval after the platforms are moved into position beneath the heaters. However, these means are so constructed and arranged that the heaters are not deenergized if the platforms are moved from position beneath the heater prior to the expiration of the time interval. Hence, these means are effective to automatically cut off the heat supply and prevent the platforms from becoming charred in the event that the operator does not allow the turret mechanism to index after the platforms have been exposed for a sufficient length of time to activate the cement. Consequently, the platforms are protected from overexposure if the operator deliberately holds them in the machine beyond the requisite heating period or if he inadvertently forgets to index the machine.

Figure 5:
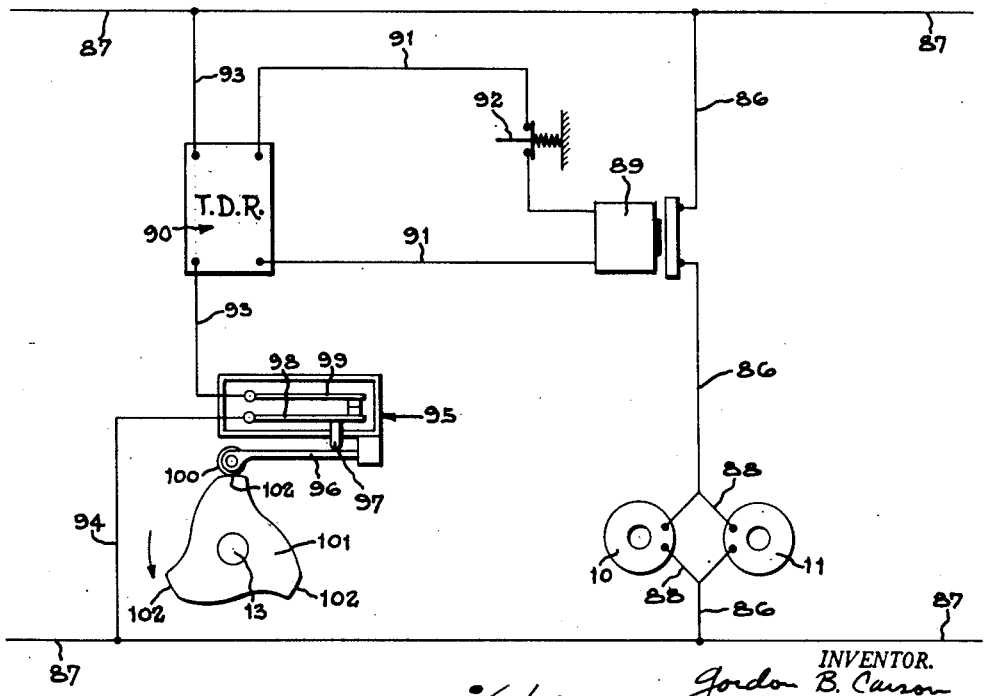
Figure 5 is a diagrammatic portrayal of the wiring diagram for the timing controls for the heaters of the machine.

Referring to Figure 5, the energizing circuit for the heaters consists of a lead 86 connected across a suitable source of electrical energy such as two supply lines 87. The heaters 10 and 11 are connected in parallel in the circuit through branch leads 88. This circuit can be broken with resultant de-energization of the heaters by means of a solenoid type circuit breaker 89 connected in a control circuit which is effective to energize the circuit breaker a predetermined time after the work holders are brought into register with the stations.

The control circuit includes a time delay relay or switch 90 which may be of any suitable construction but is preferably of the type which can be adjusted to allow different time intervals to expire between the time it is initially energized and the time it closes. For example, the commercially available switch known as Agastat NE 11 which is manufactured by the American Gas Accumulater Company of New Jersey and is adjustable to provide a 30 to 50 second time delay is entirely suitable for this purpose. This relay is connected through leads 91 to the circuit breaker 89. A re-set switch 92 which is normally spring-urged to closed position is placed in the circuit. The time delay relay is energized from the main supply lines 87 through leads 93 and 94 when a micro-switch 95 connected in line 93 is closed. In other words, when the micro-switch 95 is closed, the time delay relay is energized and after the expiration of the interval to which the relay is adjusted, the relay closes, energizing the circuit through leads 91 to circuit breaker 89, the circuit breaker is activated and the heater energizing circuit is broken. If the micro-switch is opened before the expiration of the time interval, switch 90 does not close, the circuit breaker 89 is not energized, and the heaters 10 and 11 continue uninterrupted operation.

As best seen in Figures 1 and 5, the micro-switch is opened and closed by the movement of a spring arm 96 which drives a stud 97 attached to one of the two contact arms 98 and 99 of a micro-switch 95, a roller cam 100 is rotatably mounted on the end of arm 96 in a position to ride the surface of a cam 101 fixed to the shaft 13 and supported by a collar 101a. This cam has three raised projections 102 corresponding to the positions of registry of the work holders with the heaters. Hence, as the shaft rotates, the roller cam 100 follows the surface of cam 101, and as the work holders are stopped in registry with the heaters the follower cam is engaged with one of the projections on the cam. At this position, arm 96 is forced rearwardly and the stud 97 pushes the arm 98 of the micro-switch into contact with the other arm 99 completing the circuit. When the turret is indexed the projection 102 leaves contact with the roller, and the arm 96 moves outwardly, permitting the spring type contact arm 98 of the micro-switch to move away from the other contact arm 99 and break the circuit.

It will consequently be appreciated that if the operator either inadvertently or intentionally leaves the platforms exposed in registry with the heating station beyond the minimum required for the fractional activation period, the projections on the cam 101 will keep the control circuit closed until the time delay switch energizes the circuit breaker and the heaters are de-energized. If the time delay switch is properly adjusted this will occur before the platforms are damaged by overheating. On the other hand, if the turret is indexed before the time delay switch closes, the heaters will continue uninterrupted operation.

Having described my invention, I claim:

1. A device for differentially heating a shoe platform and the like coated marginally with thermoplastic adhesive to render the entire platform pliable and the cement tacky, said device comprising; a heater, a platform holder movable into and out of registered exposed position relative to said heater, said heater having a substantially annular heat emitting body portion said heat emitting body portion extending substantially over the cement coated portions of the platform when said platform is brought into exposed registered position relative to said heater by said holder, the central portion of said annular heat emitting body being aligned with the uncoated portions of said platform, whereby said platforms are differentially heated, the cement coated portions being exposed to direct heat of comparatively greater intensity and the uncoated portions being exposed to radiating heat of comparatively less intensity.

2. A device for activating thermoplastic cement on shoe parts and the like for a predetermined total activation period, said device comprising; a heater, a voltage supply circuit for energizing said heater, a movable platform holder, means for moving said platform holder into and out of registry with said heater, and means for opening said circuit to deenergize said heater a predetermined time interval after said platform holder is brought into registry with said heater said predetermined time interval corresponding to a fraction of said total activation period, said latter named means being rendered inactive to effect deenergization of said heater upon movement of said platform out of registry with said heater prior to the expiration of said time interval.

3. A device for activating thermoplastic adhesive on shoe parts for a predetermined total activation period, said device comprising; a frame, a turret rotatably mounted on said frame, a plurality of holders adapted to carry shoe parts in cement exposed position, said holders being radially mounted on said turret and equally spaced in relation to each other whereby when said turret is rotated said holders move in a circular path, a plurality of electric heaters mounted on said frame and positioned over the path of movement of said holder to direct heat thereon, said heaters being spaced corresponding to the spacing between said holders, means for intermittently rotating said turret to cause indexed movement of said holders through said path from heater to heater, and normally closed circuit means for energizing said heaters, said circuit means being effective to deenergize said heaters after said holders have been indexed with each heater for a predetermined period corresponding to a fraction of said total activation period.

4. A device for activating for a predetermined total activation period thermoplastic cement coated on shoe platforms and the like, said device comprising a frame, a turret rotatably mounted on said frame, said turret adapted to carry a plurality of platforms in cement exposed position at equal radii from the axis of rotation of said turret whereby rotation of said turret causes movement of said platforms through a circular path, a plurality of electric heating elements mounted on said frame in spaced relationship to each other and positioned to radiate heat toward portions of said path, means for intermittently rotating said turret, whereby said platforms may be progressively advanced from heating element to heating element at each of which they may be subjected to brief activation heating periods, and circuit means for energizing said heaters, said circuit means being effective to deenergize said heaters after said holders have been indexed with each heater for a predetermined period corresponding to a fraction of said total activation period.

References Cited in the file of this patent

UNITED STATES PATENTS

| Number | Name | Date |
| --- | --- | --- |
| 1,344,285 | Wolff | June 22, 1920 |
| 1,706,017 | Wiegand | Mar. 19, 1929 |
| 1,962,250 | Macdonald | June 12, 1934 |
| 2,014,472 | French | Sept. 17, 1935 |
| 2,054,669 | Bunzl | Sept. 15, 1936 |
| 2,192,266 | Kallander | Mar. 5, 1940 |
| 2,255,166 | Hardwick et al. | Sept. 9, 1941 |
| 2,290,356 | Reinhold | July 21, 1942 |
| 2,582,464 | Small | Jan. 15, 1952 |
| 2,584,951 | Wenger | Feb. 5, 1952 |
| 2,589,088 | Johnson | Mar. 11, 1952 |